United States Patent
Li

(10) Patent No.: US 11,102,862 B2
(45) Date of Patent: Aug. 24, 2021

(54) LAMP AND BRAIN-CONTROLLED LAMP SYSTEM

(71) Applicant: BOE TECHNOLOGY GROUP CO., LTD., Beijing (CN)

(72) Inventor: Wenbo Li, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 341 days.

(21) Appl. No.: 16/307,801

(22) PCT Filed: Apr. 2, 2018

(86) PCT No.: PCT/CN2018/081501
§ 371 (c)(1),
(2) Date: Dec. 6, 2018

(87) PCT Pub. No.: WO2018/233343
PCT Pub. Date: Dec. 27, 2018

(65) Prior Publication Data
US 2021/0022219 A1      Jan. 21, 2021

(30) Foreign Application Priority Data
Jun. 23, 2017  (CN) .......................... 201710488260.1

(51) Int. Cl.
*H05B 33/08*  (2020.01)
*H05B 45/20*  (2020.01)
*H05B 45/10*  (2020.01)
*F21V 33/00*  (2006.01)

(52) U.S. Cl.
CPC ......... *H05B 45/20* (2020.01); *F21V 33/0056* (2013.01); *H05B 45/10* (2020.01)

(58) Field of Classification Search
CPC ...... F21V 33/0056; H05B 45/10; H05B 45/20
See application file for complete search history.

(56) References Cited

U.S. PATENT DOCUMENTS 4,528,989 A * 7/1985 Weinblatt ............... A61B 3/113
                                                    600/558
5,613,498 A * 3/1997 Yasushi .................. A61B 5/335
                                                    600/544
(Continued)

FOREIGN PATENT DOCUMENTS

CN      103347120 A    10/2013
CN      103428965 A    12/2013
(Continued)

OTHER PUBLICATIONS

Chinese Office Action dated Jun. 1, 2018, from application No. 201710488260.1.
(Continued)

*Primary Examiner* — Kurtis R Bahr
(74) *Attorney, Agent, or Firm* — Arch & Lake LLP

(57) ABSTRACT

A lamp includes a light emitting device, and a control device. The control device is configured to control a light emitting state of the light emitting device according to a brain wave signal detected by a brain wave detecting device. As such, the light emitting state corresponds to a mental state corresponding to the brain wave signal detected by the brain wave detecting device.

18 Claims, 5 Drawing Sheets

(56) References Cited

U.S. PATENT DOCUMENTS

| | | | | |
|---|---|---|---|---|
| 5,954,629 | A | * | 9/1999 | Yanagidaira ......... A61M 21/00 600/27 |
| 6,129,748 | A | * | 10/2000 | Kamei ................. A61M 21/00 600/544 |
| 7,749,154 | B2 | * | 7/2010 | Cornel ................. A61M 21/00 600/27 |
| 9,588,490 | B2 | * | 3/2017 | Tsang ....................... G03H 1/08 |
| 9,764,110 | B2 | * | 9/2017 | Larson ................. A61B 5/4812 |
| 2003/0062856 | A1 | * | 4/2003 | Yano ................... H05B 39/044 315/291 |
| 2007/0118026 | A1 | * | 5/2007 | Kameyama ........... A61M 21/02 600/300 |

FOREIGN PATENT DOCUMENTS

| CN | 104302035 A | 1/2015 |
|---|---|---|
| CN | 204104194 U | 1/2015 |
| CN | 204542122 U | 8/2015 |
| CN | 204909443 U | 12/2015 |
| CN | 105751961 A | 7/2016 |
| CN | 105757524 A | 7/2016 |
| CN | 105852853 A | 8/2016 |
| CN | 107231726 A | 10/2017 |
| CN | 105757524 B | 2/2018 |
| JP | 5576257 B2 | 8/2014 |
| KR | 20130137311 A | 12/2013 |
| KR | 101391687 B1 | 5/2014 |
| KR | 101518393 B1 | 5/2015 |
| WO | WO-2013/183915 A1 | 12/2013 |
| WO | WO-2015/160061 A1 | 10/2015 |

OTHER PUBLICATIONS

International Search Report and Written Opinion dated Jun. 27, 2018, from application No. PCT/CN2018/081501.

* cited by examiner

LAMP AND BRAIN-CONTROLLED LAMP SYSTEM

CROSS REFERENCE

The present disclosure is based on International Application No. PCT/CN2018/081501, filed on Apr. 2, 2018, which is based upon and claims priority to Chinese Patent Application No. 201710488260.1, filed on Jun. 23, 2017, the entire contents thereof are incorporated herein by reference.

TECHNICAL FIELD

The present disclosure relates to the field of illumination, and in particular to a lamp and a brain-controlled lamp system.

BACKGROUND

Lamps are an indispensable interior decoration in our daily life. Traditional lamps can only be lighted according to fixed brightness and color. The lighting mode is monotonous.

SUMMARY

An arrangement of the present disclosure provides a lamp. The lamp includes a light emitting device and a control device. The control device is configured to control a light emitting state of the light emitting device according to a brain wave signal detected by a brain wave detecting device, so that the light emitting state can correspond to a mental state of a user corresponding to the brain wave signal detected by the brain wave detecting device.

In an arrangement of the present disclosure, the light emitting device includes at least one red light emitting unit, at least one green light emitting unit, and at least one blue light emitting unit.

In another arrangement of the present disclosure, the control device is configured to control the number of light emitting units that emit light with various colors in the light emitting device and current levels of the light emitting units to control the light emitting state of the light emitting device.

In another arrangement of the present disclosure, the light emitting state includes at least one of color, brightness, and blinking mode.

In another arrangement of the present disclosure, when a frequency band of the brain wave signal is a $\delta$ frequency band, the control device is configured to control the light emitting device not to emit light. When the frequency band of the brain wave signal is a $\theta$ frequency band, the control device is configured to control the light emitting device to emit light with brightness less than a predetermined value. When the frequency band of the brain wave signal is a $\alpha$ frequency band or an A frequency band, the control device is configured to control the light emitting device to emit light for which at least one of color and brightness is set by the user. When the frequency band of the brain wave signal is a $\beta$ frequency band or a B frequency band, the control device is configured to control the light emitting device to emit light with a first color. When the frequency band of the brain wave signal is a $\gamma$ frequency band or a $\Gamma$ frequency band, the control device is configured to control the light emitting device to emit light with a second color.

In another arrangement of the present disclosure, when the frequency band of the brain wave signal is a $\delta$ frequency band, the control device is configured to control the light emitting device to reduce the brightness of the emitted light according to a predetermined speed until no light is emitted. The predetermined speed is related to a frequency of the brain wave signal.

In another arrangement of the present disclosure, the lamp further includes an image collection device configured to collect a face image. The control device is further configured to recognize the face image and determine a user expression controlling the light emitting state of the light emitting device according to the determined user expression and the brain wave signal.

In another arrangement of the present disclosure, the user expression includes sadness. When the frequency band of the brain wave signal is the $\alpha$ frequency band or the A frequency band, and the user expression includes sadness, the control device is configured to control the light emitting device to emit light with the user-set color and the color temperature less than a first threshold. When the frequency band of the brain wave signal is in the $\beta$ frequency band or the B frequency band, and the user expression includes sadness, the control device is configured to control the light emitting device to emit light with a first color and the color temperature less than a second threshold.

In another arrangement of the present disclosure, when the frequency band of the brain wave signal is in the $\alpha$ frequency band, the A frequency band, the $\beta$ frequency band, or the B frequency band, and the user expression includes sadness, the control device is further configured to control the light emitting device to emit flickering light.

In another arrangement of the present disclosure, the lamp further includes an audio playing device. The control device is further configured to generate an audio playing control instruction according to at least one of the brain wave signal and the face image, and control operation of the audio playing device using the audio playing control instruction.

In another arrangement of the present disclosure, the image collection device is integrated on the control device.

An arrangement of the present disclosure provide a brain-controlled lamp system. The brain-controlled lamp system includes a lamp and a brain wave detecting device. The lamp includes a light emitting device and a control device. The control device is configured to control a light emitting state of the light emitting device according to a brain wave signal detected by a brain wave detecting device, so that the light emitting state can correspond to a mental state of a user corresponding to the brain wave signal detected by the brain wave detecting device.

In an arrangement of the present disclosure, the brain wave detecting device includes a sensor configured to detect the brain wave signal of the user and a sending unit configured to send the brain wave signal of the user to the control device.

In another arrangement of the present disclosure, the control device includes a receiving unit configured to receive the brain wave signal of the user sent by the brain wave detecting device The control device includes a processing unit configured to detect a frequency band of the brain wave signal and determine a control instruction according to the frequency band of the brain wave signal. The control instruction is used to indicate a light emitting state. The control device includes a driving unit configured to drive the light emitting device to emit light according to the control instruction.

In another arrangement of the present disclosure, the brain wave detecting device includes a sensor configured to detect the brain wave signal of the user. The brain wave detecting device includes a control unit configured to determine control information corresponding to the brain wave signal, which is a frequency band of the brain wave signal or a control signal corresponding to a frequency band of the brain wave signal. The brain wave detecting device includes and a sending unit configured to send the brain wave signal of the user to the control device.

In another arrangement of the present disclosure, the control device includes a receiving unit configured to receive control information sent by the brain wave detecting device. The control device includes a processing unit configured to generate a control instruction according to the control information. The control instruction is used to indicate the light emitting state. The control device includes a driving unit configured to drive the light emitting device to emit light according to the control instruction.

BRIEF DESCRIPTION OF THE DRAWINGS

In order to more clearly illustrate the technical solutions in the arrangements of the present disclosure, the drawings used in the description of the arrangements will be briefly described below. It is apparent that the drawings in the following description show only some of the arrangements of the present disclosure, and other drawings may be obtained by those skilled in the art without departing from the drawings described herein.

DETAILED DESCRIPTION

In order to make the objects, technical solutions and advantages of the present disclosure more clear, the arrangements of the present disclosure will be further described in detail below with reference to the accompanying drawings.

Figure 1:
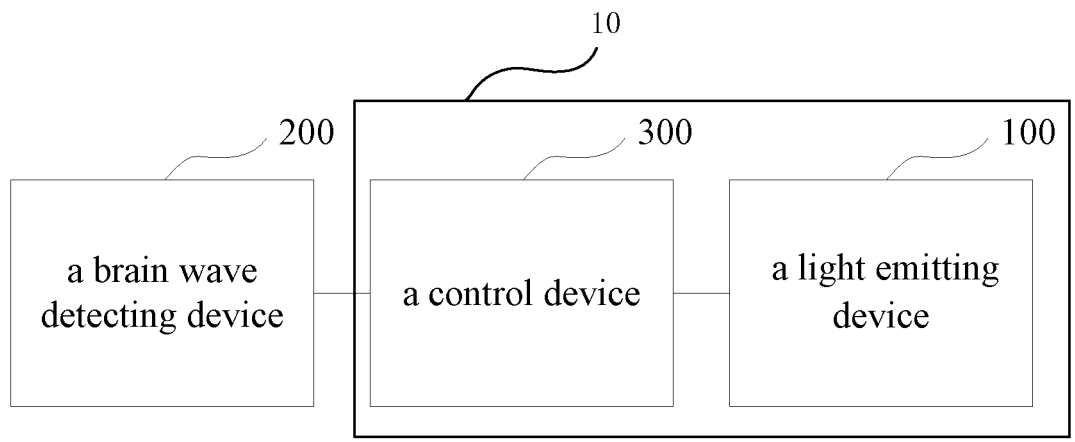
FIG. 1 is a schematic structural diagram showing a brain-controlled lamp system according to an arrangement of the present disclosure.

FIG. 1 is a schematic structural diagram showing a brain-controlled lamp system according to an arrangement of the present disclosure. Referring to FIG. 1, the brain-controlled lamp system includes a lamp 10 and a brain wave detecting device 200, wherein the lamp 10 includes a light emitting device 100 and a control device 300. The brain wave detecting device 200 is configured to detect a brain wave signal of a user; the control device 300 is configured to control a light emitting state of the light emitting device 100 according to the brain wave signal detected by the brain wave detecting device 200, so that the light emitting state is corresponded to a mental state of the user corresponding to the brain wave signal detected by the brain wave detecting device 200. Wherein, the brain wave signal can also be called electroencephalogram.

The arrangement of the present disclosure provides a brain-controlled lamp system, which uses the brain wave detecting device to detect the brain wave signal of the user, and controls the light emitting state of the light emitting device according to the brain wave signal of the user, so that the light emitting state can be corresponded to the mental state of the user corresponding to the brain wave signal. That is, the light emitting state of the light emitting device is corresponded to the mental state of the user, so that the light emitted by the lamp can meet the needs of the user.

Figure 2A:
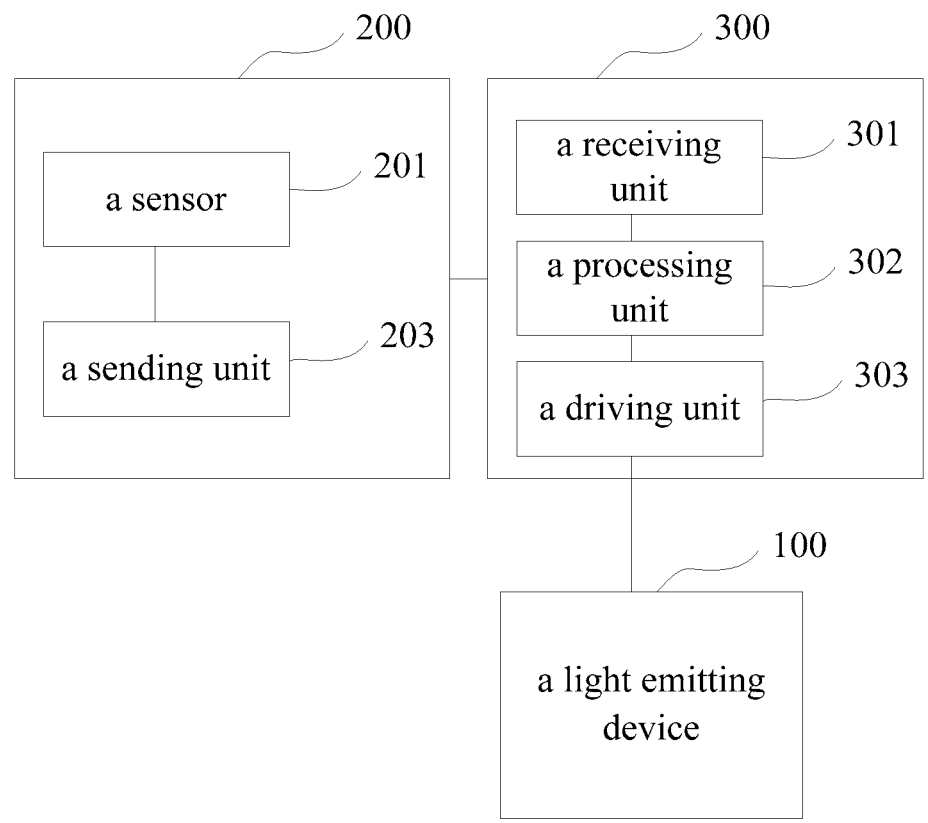
FIG. 2A is a schematic structural diagram showing a brain-controlled lamp system according to an arrangement of the present disclosure.

FIG. 2A is a schematic structural diagram showing a brain-controlled lamp system according to an arrangement of the present disclosure. Referring to FIG. 2A, the brain wave detecting device 200 includes a sensor 201 and a sending unit 203. The sensor 201 is configured to detect the brain wave signal of the user and the sending unit 203 is configured to send the brain wave signal of the user to the control device 300. Accordingly, the control device 300 includes a receiving unit 301, a processing unit 302, and a driving unit 303. The receiving unit 301 is configured to receive the brain wave signal of the user sent by the brain wave detecting device 200. The processing unit 302 is configured to detect a frequency band of the brain wave signal and determine a control instruction according to the frequency band of the brain wave signal. The control instruction is used to indicate the light emitting state. The driving unit 303 is configured to drive the light emitting device 100 to emit light according to the control instruction.

In this implementation, the processing unit is disposed on the control device 300, and the brain wave detecting device only includes the sensor and the sending unit, so that the brain wave detecting device is light in weight and easy to use (such as headset).

In the arrangement of the present disclosure, there are two ways in which the processing unit 302 detects the frequency band of the brain wave signal may. One way is to compare a detected waveform of the brain wave signal with the waveform of the brain wave signal of the known frequency band, and the frequency band of the known brain wave signal having the highest similarity with the detected brain wave signal is configured as the detected brain wave signal frequency band. This way is relatively simple but cannot accurately detect a specific frequency of the brain wave signal. The other way is to directly detect a peak and a valley of the waveform of the brain wave signal, and then determine the specific frequency of the brain wave signal, thus obtain the frequency band of the brain wave signal In the arrangement of the present disclosure, the processing unit 302 determines the control instruction according to the frequency band of the brain wave signal, and may be specifically performed as follows: obtaining a correspondence between the frequency band of the brain wave signal and the control instruction; determining the control instruction corresponding to the detected frequency band of the brain wave signal according to the frequency band of the detected brain wave signal and the correspondence between the frequency band of the brain wave signal and the control instruction. Here, the correspondence between the frequency band of the brain wave signal and the control instruction is stored in the control device 300 in advance, and the correspondence will be described later.

In the arrangement of the present disclosure, the driving unit 303 may be a driving circuit, which is configured to generate a corresponding current signal according to the foregoing control instruction, and control the light emitting unit.

Figure 2B:
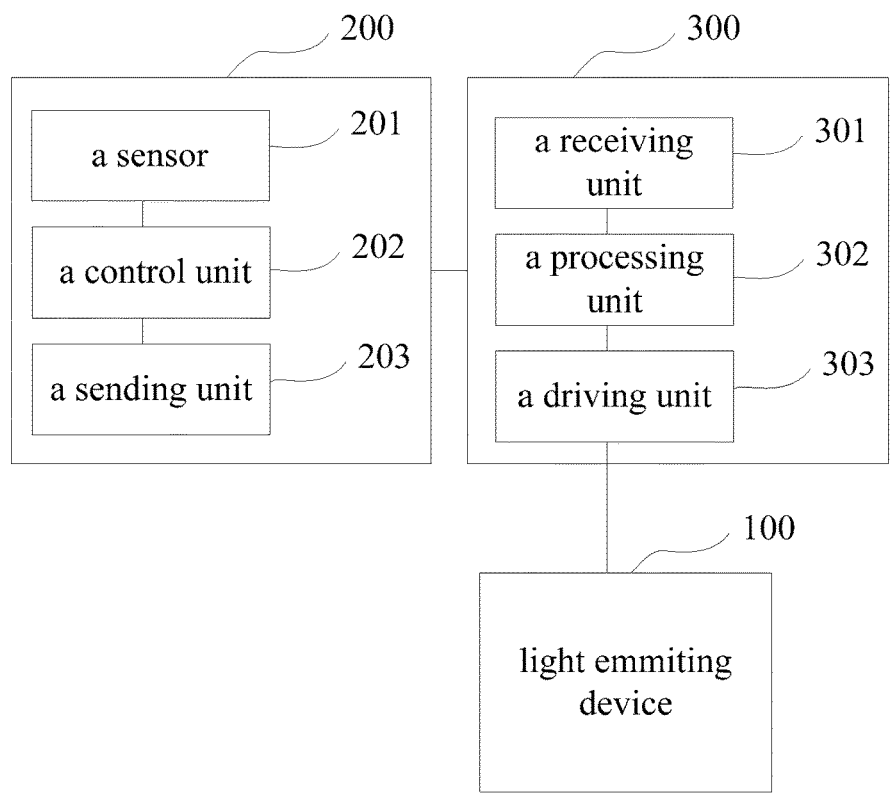
FIG. 2B is a schematic structural diagram showing another brain-controlled lamp system according to an arrangement of the present disclosure.

FIG. 2B is a schematic structural diagram showing another brain-controlled lamp system according to an arrangement of the present disclosure. Referring to FIG. 2B, the brain wave detecting device 200 includes a sensor 201, a control unit 202, and a sending unit 203. The sensor 201 is configured to detect the brain wave signal of the user. The control unit 202 is configured to determine control information corresponding to the brain wave signal, and the control information is the frequency band of the brain wave signal or a control signal corresponding to the frequency band of the brain wave signal. The sending unit 203 is configured to send the control information corresponding to the brain wave signal to the control device 300. The control device 300 includes a receiving unit 301, a processing unit 302, and a driving unit 303. The receiving unit 301 is configured to receive the control information sent by the brain wave detecting device 200. the processing unit 302 is configured to generate the control instruction according to the control information, which is configured to indicate the light emitting state; and the driving unit 303 is configured to drive the light emitting device 100 to emit light according to the control instruction.

In this implementation, the control unit is disposed on the brain wave detecting device to detect the brain wave signal, so that the brain wave detecting device only needs to send the frequency band of the brain wave signal or the control signal to the control device, which can reduce the difficulty of signal transmission compared to the transmission of the brain wave signal.

In such an implementation, the control unit 202 can perform frequency band detection and control instruction generation in the same way as that the processing unit 302 performed in the previous implementation.

In this implementation, the control unit 202 sends the control information through the sending unit 203. The control information includes a frequency band that may be a brain wave signal, or may be a control signal. The control signal here can be either a signal after the control instruction is encapsulated by the transmission protocol or a signal for indicating the control instruction. In addition to the content of the frequency band of the brain wave signal or the control signal, the control information may include a number corresponding to the frequency band of the brain wave signal or a number corresponding to the control signal. For example, the control information includes NO. 1, which indicates the frequency band of the brain wave signal is a δ frequency band. The correspondence between the number and the control information is stored in both the control unit 202 and the processing unit 302, which can further facilitate the transmission of the control information.

In the two implementation ways shown in FIGS. 2A and 2B above, the brain wave detecting device 200 can be a headset to ensure the accuracy of brain wave detection.

The sensor can be an embedded brain wave sensor or an external brain wave sensor. Brain wave detection can be achieved with both types of sensors. The embedded brain wave sensor is the brain wave sensor implanted in a cerebral cortex, and the external brain wave sensor is the brain wave sensor attached to a head. When the sensor is the brain wave sensor implanted in the cerebral cortex, the brain wave detecting device 200 only includes the sensor 201 and the sending unit 203, and the sending unit 203 is integrated on the chip of the brain wave sensor implanted in the cerebral cortex, that is, both the sensor 201 and the sending unit 203 are integrated on a single chip.

In the foregoing two implementation ways shown in FIGS. 2A and 2B, the sending unit 203 and the receiving unit 301 are respectively a wireless sending unit and a wireless receiving unit, and the adopted protocols include but are not limited to Bluetooth, WIFI (Wireless-Fidelity) and other wireless transmission protocols.

In the above two implementations shown in FIGS. 2A and 2B, the control unit 202 and the processing unit 302 can adopt a common processing chip, such as a CPU (Central Processing Unit) and an FPGA (Field Programmable Gate Array), etc.

In an arrangement of the present disclosure, the light emitting device 100 includes at least one red light emitting unit (Light Emitting Diode), at least one green light emitting unit, and at least one blue light emitting unit. In an arrangement of the present disclosure, the light emitting device is constituted by an R (Red) G (Green) B (Blue) three-color light emitting unit, achieving a blend of any color. In an arrangement of the present disclosure, the light emitting device 100 includes a plurality of red light emitting units, a plurality of green light emitting units, and a plurality of blue light emitting units, so that the color and brightness of the light emitted from the light emitting device can be adjusted by controlling the number of light emitting units that emit light, and the brightness control accuracy for each light emitting unit can be reduced. Thus the control difficulty can be reduced. The light emitting unit can be realized by using an LED (Light Emitting Diode).

Further, the control device 300 is configured to control the number of light emitting units that emit light with respective colors in the light emitting device, and current levels flowing through the light emitting units that emit light to control the light emitting state of the light emitting device 100. The light emitting unit is realized by the LED, and the LED is a current light emitting device. The brightness can be controlled by controlling the number of the light emitting units emitting respective colors and the current of the light emitting units. The brightness of the light emitting units of different colors determines the overall color and brightness of the light emitting device.

In an arrangement of the present disclosure, the light emitting state includes at least one of the color, the brightness, and the blinking mode. For example, only one of the color, the brightness and the blinking mode is controlled; both the color and the brightness are controlled; both the color and the blinking mode are controlled; both the brightness and the blinking mode are controlled; or the color, the brightness, and the blinking mode are controlled at the same time.

In this arrangement, the correspondence between the frequency band of the brain wave and the human mental state is as shown in the following table.

Figure 3A:
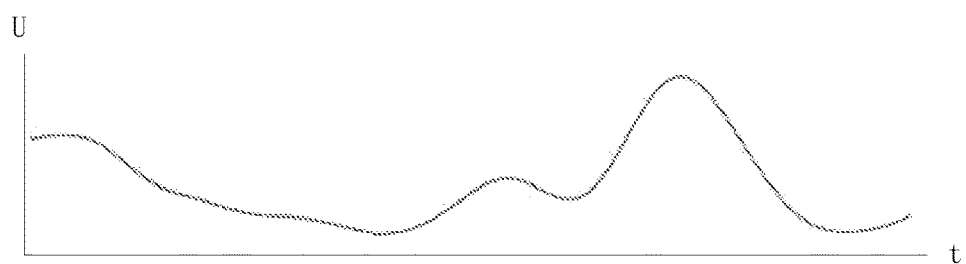
FIG. 3A-3E are schematic diagrams showing brain waves provided by an arrangement of the present disclosure.
Figure 3B:
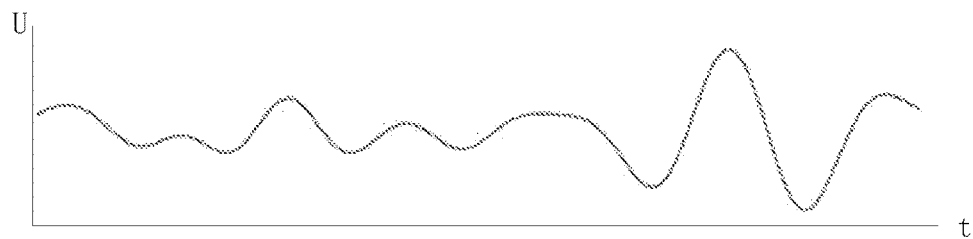

| Frequency Band | Frequency (Hz) | Mental State | Waveform |
|---|---|---|---|
| δ | 0.5-2.75 | a deep sleep state, appearing only when there is deep dreamless sleep, and sometimes on fairly sophisticated meditators. | FIG. 3A (wherein, t represents time, U represents voltage) |
| θ | 3.5-6.75 | a light sleep state (that is, depth mode state, contemplative state, meditation | FIG. 3B |

-continued

Figure 3C:
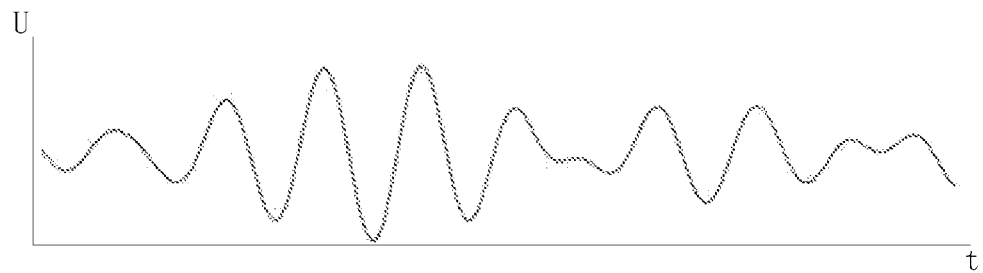
Figure 3D:
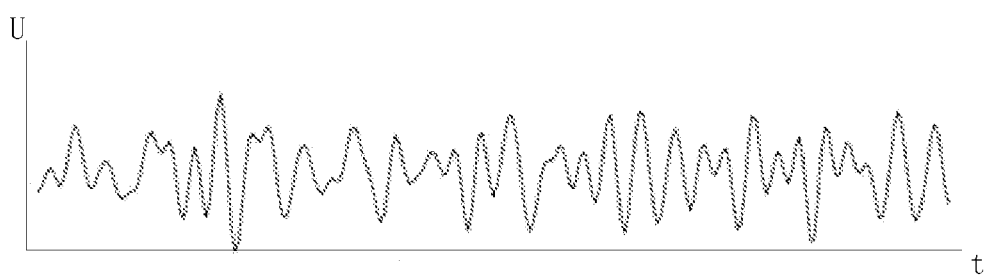
Figure 3E:
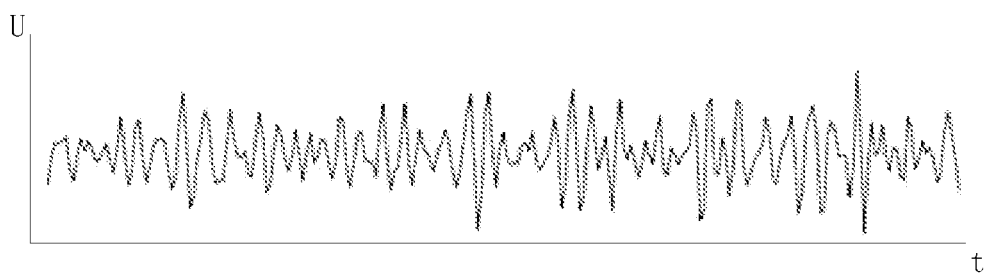

| Frequency Band | Frequency (Hz) | Mental State | Waveform |
|---|---|---|---|
| | | state, subconscious state), in this state: subconsciousness is implied; creativity, sudden inspiration; perception, intuition; accelerated learning, memory; and the ordinary person can consciously adjust to this state after long-term training. | |
| α<br>A | 7.5-9.25<br>10-11.75 | a relaxed state, the brain is sober and relaxed, it is easy to concentrate on learning and working and not easy to be disturbed by the outside world. It is not easy to fatigue, and the ordinary person can consciously adjust to this state after long-term training. | FIG. 3C |
| β<br>B | 13-16.75<br>18-29.75 | a tense state, it is sensitive to the surrounding environment, and it is difficult to concentrate and it is easy to fatigue. Most people are in this state when they are awake. | FIG. 3D |
| γ<br>Γ | 31-39.75<br>41-49.75 | a detached state, beyond the state that most people can tolerate, only short-term, burst-like appearances, high creativity and insight will occur in this state, meditation will occur, and there will be feelings of detachment. | FIG. 3E |

In the arrangement of the present disclosure, the frequency band of the brain wave signal is divided into a δ frequency band, a θ frequency band, an α frequency band, an A frequency band, a β frequency band, a B frequency band, a γ frequency band, and a Γ frequency band.

When a frequency band of the brain wave signal is the δ frequency band, the control device 300 is configured to control the light emitting device 100 not to emit light. When the frequency band of the brain wave signal is the θ frequency band, the control device 300 is configured to control the light emitting device 100 to emit light with brightness less than a predetermined value. When the frequency band of the brain wave signal is the α frequency band or the A frequency band, the control device 300 is configured to control the light emitting device 100 to emit light for which at least one of color and brightness is set by the user. When the frequency band of the brain wave signal is the β frequency band or the B frequency band, the control device 300 is configured to control the light emitting device 100 to emit a first color light. When the frequency band of the brain wave signal is the γ frequency band or the Γ frequency band, the control device 300 is configured to control the light emitting device 100 to emit a second color light. The predetermined value may be a brightness threshold stored in the lamp 10 in advance, or a brightness threshold set by the user, or may also be a brightness threshold calculated according to the brain wave signal of the signal. The light for which at least one of color and brightness is set by the user is the light that the user sets the color and brightness that he or she wants to see in a relaxed state according to his or her preference, and the light may include a plurality of colors and brightness, which enables the user in a relaxed state to see the light he likes, so that the mood is more pleasant.

In this implementation way, when the brain wave signal of the user is in the δ frequency band, the user is in a deep sleep state, and turning off the light at this time is good for the user to sleep. When the brain wave signal of the user is in the θ frequency band, the user is in a light sleep state, and setting the light with lower brightness is good for the user to relax. When the brain wave signal of the user is in the α frequency band and the A frequency band, the user is relatively relaxed, and the light can be adjusted at this time according to at to the light for which at least one of color and brightness is set by the user. When the brain wave signal of the user is in the β frequency band and the B frequency band, the user is relatively tense, and the light at this time can be adjusted to the first color light, for example, it can be green light, so that the light can relax the mental state of the user. When the brain wave signal of the user is in the γ frequency band and the Γ frequency band, the user is in the detached state, and only the user in a meditation state can be achieved, so the light can be adjusted to the first color light at this time, for example, it can be yellow light, and the yellow light is configured to cater for the user to complete meditation and other actions. The light emitting state of the lamp 10 corresponds to the mental state of the user by different control instructions corresponded to different frequency bands of the brain wave signals.

When the frequency band of the brain wave signal is the δ frequency band, the control device 300 is configured to control the light emitting device 100 to reduce the brightness of the emitted light according to a predetermined speed until no light is emitted. The predetermined speed is related to a frequency of the brain wave signal.

For example, in the δ frequency band, the smaller the frequency of the brain wave signal, the faster the predetermined speed, the faster the brightness of the emitted light decreases.

When the brain wave signal of the user is in the θ frequency band, the control device 300 is configured to control the brightness of the light emitted from the light emitting device 100 to be less than the predetermined value. The predetermined value may be a fixed brightness value, and the predetermined value may also be a relative brightness value. For example, the brightness may be the percentage of brightness before adjustment, and the brightness may be 50% of the brightness before adjustment.

Figure 4:
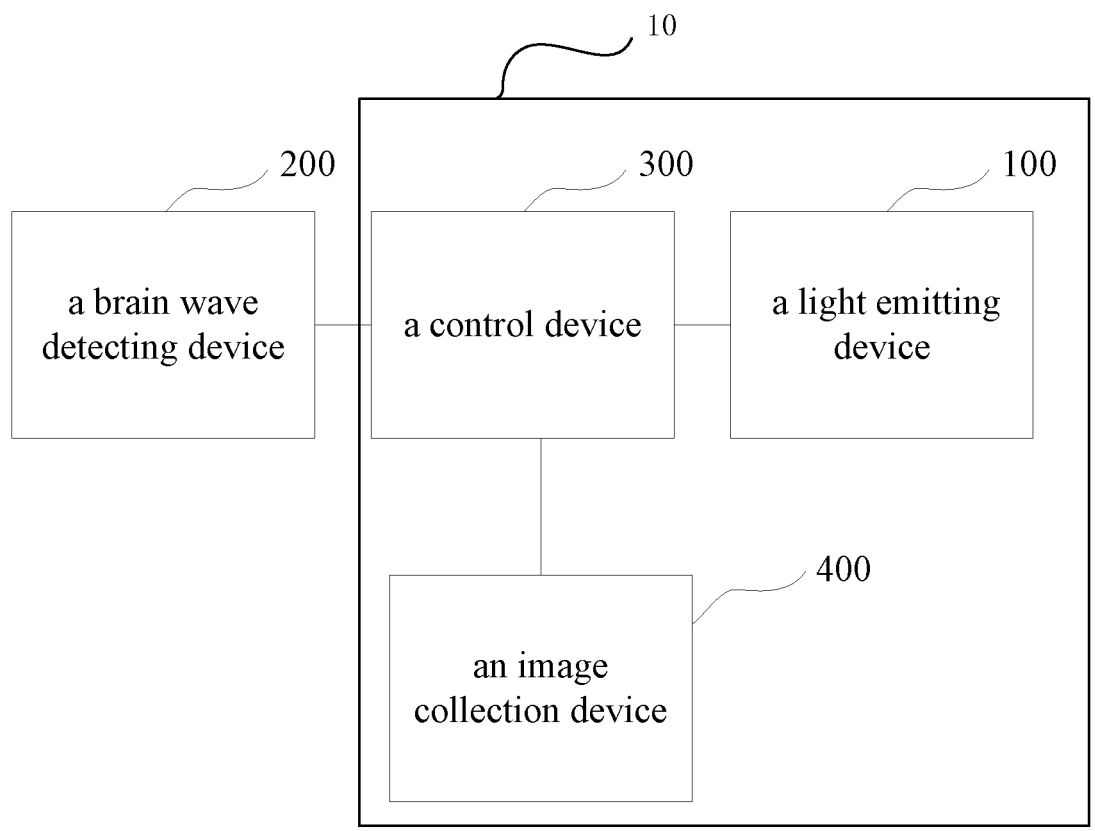
FIG. 4 is a schematic structural diagram showing another brain-controlled lamp system according to an arrangement of the present disclosure.

FIG. 4 is a schematic structural diagram showing another brain-controlled lamp system according to an arrangement of the present disclosure. Referring to FIG. 4, compared with the lamp 10 in the brain-controlled lamp system shown in FIG. 1, the lamp 10 further includes an image collection device 400. The image collection device 400 is configured to collect face images. The control device 300 is further configured to recognize the face image and determine a user expression. The light emitting state of the light emitting device 100 is controlled according to the determined user expression and the brain wave signal. The user expression is determined according to the face image, and the light emitting state of the light emitting device is controlled according to the determined user expression and the brain wave signal, in this way that the controlling of the light emitting state is more suitable for user's demands.

In the arrangement of the present disclosure, the user expression recognition is completed by the processing unit 302 in the control device 300. The processing unit 302 uses a classifier to classify the face image, thus determining the use expression. Specifically, the classifier is trained by collecting samples of different expressions of the user in advance, and then the classifier is obtained. When the face images are collected, the classifier is configured to classify the face images to determine the user expression.

Before the control device 300 classifies and recognizes the face images, the face images may be preprocessed to ensure recognition accuracy. The preprocessing includes but not limited to histogram equalization, gray level normalization, mean value filtering, and median filtering, etc.

In the arrangement of the present disclosure, the control device 300 may perform expression recognition on the collected face images according to the face image recognition way, and the recognized expression may include at least sadness. The recognition of other expressions such as happiness, anger, etc. may also be performed as needed.

In the arrangement of the present disclosure, when the control device 300 adjusts the color of the light, the color set by the user, green color, or yellow color actually include different color temperatures. For example, the green color may be dark green, light green, etc. When the control device 300 controls the light emitting device to emit light, any one of these colors within their color temperature ranges can be selected.

When the frequency band of the brain wave signal is the $\alpha$ frequency band and the A frequency band, and the user expression is sad, the control device 300 is configured to control the light emitting device 100 to emit light of a user-set color and the color temperature of the light is less than a first threshold. When the frequency band of the brain wave signal is the $\beta$ frequency band or the B frequency band, and the user expression is sad, the control device 300 is configured to control the light emitting device 100 to emit the first color light and the color temperature of the light is less than a second threshold. When the user expression is sad, the color temperature of the light is controlled to be lower than a threshold, so that the light presents a warm color, which can generate a warm effect to the user. Wherein, the first threshold may be a value within the color temperature range of the user-set color, and the second threshold may be a value within a green color temperature range. For example, the threshold (first threshold or second threshold) herein may be half the sum of the upper and lower limits of the color temperature range.

Further, when it is recognized that the user expression is sad, the brightness of the light may be controlled to be less than the brightness threshold, so as to avoid excessive brightness to cause irritation to the user.

Here, the first threshold, the second threshold, and the brightness threshold may all be set according to actual conditions.

Further, when the frequency band of the brain wave signal is the $\alpha$ frequency band, the A frequency band, the $\beta$ frequency band or the B frequency band, and the user expression is sad, the control device 300 is further configured to control the light blinking emitted by the light emitting device 100. The user expression is captured by the image collection device, so that when the user is in a sad state, the atmosphere can be activated by the blinking light or the like.

When the control instruction instructs the light emitting device 100 to emit flickering light, specifically, it is required to indicate the frequency of flickering, the time of flickering, and the like. Specifically, the frequency of flickering, the time of flickering may be corresponded to the frequency of the brain wave signal. For example, in the current brain wave frequency band, for a lower frequency of the brain wave signal, the emitted light from the light emitting device 100 may flickering for longer time and have a slower flickering frequency.

Figure 5:
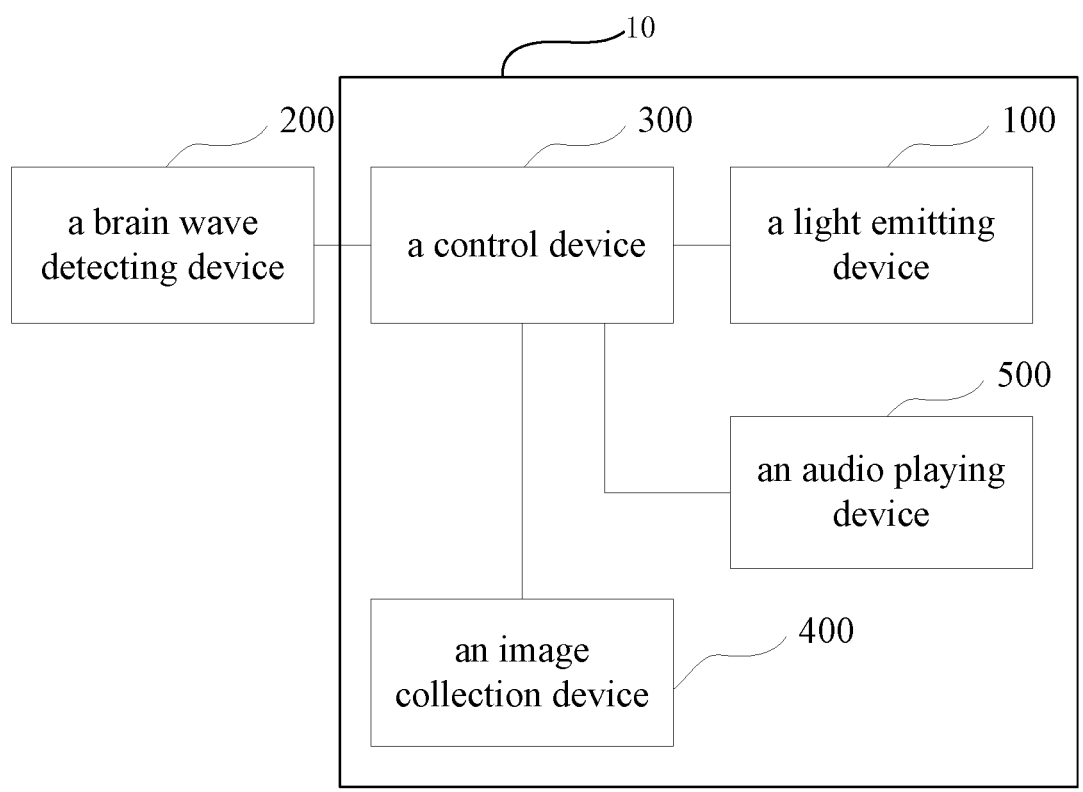
FIG. 5 is a schematic structural diagram showing another brain-controlled lamp system according to an arrangement of the present disclosure.

FIG. 5 is a schematic structural diagram showing another brain-controlled lamp system according to an arrangement of the present disclosure. Referring to FIG. 5, the lamp 10 further includes an audio playing device 500 compared to the brain-controlled lamp system shown in FIG. 4. The control device 300 is further configured to generate an audio play control instruction according to at least one of the brain wave signal and the face image, and control the operation of the audio playing device 500 by using the audio play control instruction. The audio playing device 500 is controlled according to at least one of the brain wave signal and the face image to output a sound corresponding to the state of the user, so that the environment in which the user is located has a suitable sound environment in addition to a suitable lighting environment, for example, when the user is in a sad state, the atmosphere is warmed up by the sound.

Specifically, the audio playing device 500 can play content such as voice, music, story, and the like. Specifically, the lamp 10 further includes a storage device for storing voice content, and the voice content in the storage device may be set by the user in advance, or may be the content set when the lamp shipped from the factory. Playing modes include, but are not limited to, random, sequential playing, and the like. The storage device is integrated on the audio playing device 500 or the control device 300.

Further, the control device 300 is further configured to control the volume output by the audio playing device 500 according to the frequency of the brain wave signal. For example, when the frequency of the brain wave signal is lower than the first sound threshold or higher than the second sound threshold, the volume output by the audio playing device 500 is controlled to be smaller, and the second sound threshold is greater than the first sound threshold. For example, when the frequency band of the brain wave signal is the $\delta$ frequency band, the $\theta$ frequency band, the $\gamma$ frequency band, and the $\Gamma$ frequency band, the volume output by the audio playing device 500 is less than that when the frequency band of the brain wave signal is the $\alpha$ frequency band, the A frequency band, the $\beta$ frequency band, and the B frequency band.

The audio playing device 500 can be a loudspeaker or other sound playing module or device.

In the arrangement of the present disclosure, the image collection device 400 can be integrated on the control device 300 to facilitate the overall arrangement and movement of the lamp 10. The image collection device 400 can be a camera, and employing the camera as the image collection device 400 is low in cost and easy to install.

In the arrangement of the present disclosure, the brain wave detecting device 200 is configured to periodically detect the brain wave signal of the user and output it to the control device 300, so that the control device 300 periodically controls the light emitting state of the light emitting device 100. The real-time adjustment of the light is realized by the periodically detection, so as to avoid the situation that the light state is not updated in time as the mental state of the user changes. The length of the period can be adjusted as needed, such as half an hour.

The above are only the arrangements of the present disclosure, and are not intended to limit the present disclosure. Any modifications, equivalents, improvements, etc. within the spirit and scope of the present disclosure are intended to be included in the scope of the present disclosure.

What is claimed is:

1. A lamp, comprising:
    a light emitting device; and
    a control device, wherein the control device is configured to control a light emitting state of the light emitting device according to a brain wave signal detected by a brain wave detecting device to cause the light emitting state to correspond to a mental state associated with the brain wave signal, wherein
    when a frequency band of the brain wave signal is a δ frequency band, the control device is configured to control the light emitting device not to emit light;
    when the frequency band of the brain wave signal is a θ frequency band, the control device is configured to control the light emitting device to emit light with brightness less than a predetermined value;
    when the frequency band of the brain wave signal is a α frequency band or an A frequency band, the control device is configured to control the light emitting device to emit light with at least one of a set color and a set brightness;
    when the frequency band of the brain wave signal is a β frequency band or a B frequency band, the control device is configured to control the light emitting device to emit light with a first color; and
    when the frequency band of the brain wave signal is a γ frequency band or a Γ frequency band, the control device is configured to control the light emitting device to emit light with a second color.

2. The lamp according to claim 1, wherein the light emitting device comprises a plurality of light emitting units, the plurality of light emitting units further comprising at least one red light emitting unit, at least one green light emitting unit, and at least one blue light emitting unit.

3. The lamp according to claim 2, wherein the control device is configured to control a number of the plurality of light emitting units that emit light with respective colors in the light emitting device and current levels of the plurality of light emitting units to control the light emitting state of the light emitting device.

4. The lamp according to claim 1, wherein the light emitting state comprises at least one of color, brightness, and blinking mode.

5. The lamp according to claim 1, wherein when the frequency band of the brain wave signal is a δ frequency band, the control device is configured to control the light emitting device to reduce the brightness of emitted light according to a predetermined speed until no light is emitted, and the predetermined speed is related to a frequency of the brain wave signal.

6. The lamp according to claim 1, wherein the lamp further comprises:
    an image collection device configured to collect a face image;
    the control device is configured to recognize the face image, determine a user expression, and control the light emitting state of the light emitting device according to the determined user expression and the brain wave signal.

7. The lamp according to claim 6, wherein when the frequency band of the brain wave signal is a α frequency band, a A frequency band, a β frequency band, or a B frequency band, and the user expression comprises sadness, the control device is further configured to control light emitted by the light emitting device to flicker.

8. The lamp according to claim 6, wherein the lamp further comprises: an audio playing device;
    the control device is configured to generate an audio playing control instruction according to at least one of the brain wave signal and the face image, and the audio playing control instruction is adopted to control operation of the audio playing device.

9. The lamp according to claim 6, wherein the image collection device is integrated on the control device.

10. The lamp according to claim 1, wherein
    when the frequency band of the brain wave signal is a α frequency band or a A frequency band, and the user expression comprises sadness, the control device is configured to control the light emitting device to emit light with a set color, a color temperature of the light with the set color being less than a first threshold; and
    when the frequency band of the brain wave signal is a β frequency band or a B frequency band, and the user expression comprises sadness, the control device is configured to control the light emitting device to emit light with the first color, a color temperature of the light with the first color is less than a second threshold.

11. A brain-controlled lamp system, the system comprising:
    the lamp as claimed in claim 1; and
    the brain wave detecting device.

12. The brain-controlled lamp system according to claim 11, wherein the brain wave detecting device comprises:
    a sensor, configured to detect the brain wave signal; and
    a sending unit, configured to send the brain wave signal to the control device.

13. The brain-controlled lamp system according to claim 12, wherein the control device comprises:
    a receiving unit configured to receive the brain wave signal sent by the brain wave detecting device;
    a processing unit configured to detect a frequency band of the brain wave signal, wherein a control instruction is determined according to the frequency band of the brain wave signal to instruct a light emitting state; and
    a driving unit configured to drive the light emitting device to emit light according to the control instruction.

14. The brain-controlled lamp system according to claim 11, wherein the brain wave detecting device comprises:
    a sensor configured to detect the brain wave signal;
    a control unit configured to determine control information corresponding to the brain wave signal, wherein the control information is a frequency band of the brain wave signal or a control signal corresponding to the frequency band of the brain wave signal; and
    a sending unit configured to send the brain wave signal to the control device.

15. The brain-controlled lamp system according to claim 14, wherein the control device comprises:
- a receiving unit configured to receive the control information sent by the brain wave detecting device;
- a processing unit configured to generate the control instruction according to the control information, wherein the control instruction is used to instruct a light emitting state; and
- a driving unit, configured to drive the light emitting device to emit light according to the control instruction.

16. The brain-controlled lamp system according to claim 11, wherein the light emitting device comprises a plurality of light emitting units, the plurality of light emitting units further comprising at least one red light emitting unit, at least one green light emitting unit, and at least one blue light emitting unit.

17. The brain-controlled lamp system according to claim 16, wherein the control device is configured to control a number of the plurality of light emitting units that emit light with various colors in the light emitting device and current levels of the plurality of light emitting units to control the light emitting state of the light emitting device.

18. The brain-controlled lamp system according to claim 11, wherein the light emitting state comprises at least one of color, brightness, and blinking mode.

* * * * *